(12) United States Patent
Phelps et al.

(10) Patent No.: US 8,112,989 B1
(45) Date of Patent: Feb. 14, 2012

(54) ELECTRICALLY RESISTIVE COATING FOR REMEDIATION (REGENERATION) OF A DIESEL PARTICULATE FILTER AND METHOD

(75) Inventors: Amanda C. Phelps, Malibu, CA (US); Kevin K. Kirby, Calabasas Hills, CA (US); Daniel J. Gregoire, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 785 days.

(21) Appl. No.: 12/178,520

(22) Filed: Jul. 23, 2008

(51) Int. Cl.
*F01N 3/10* (2006.01)
*B01D 50/00* (2006.01)

(52) U.S. Cl. .............. 60/299; 60/300; 60/301; 422/174; 422/175; 422/180

(58) Field of Classification Search .................. 422/174, 422/175, 180; 60/273, 299, 300, 301; 55/282, 55/523; 95/278
See application file for complete search history.

(56) References Cited

U.S. PATENT DOCUMENTS

| | | | | |
|---|---|---|---|---|
| 5,423,902 A * | 6/1995 | Strutz et al. | ...................... | 95/273 |
| 5,458,673 A * | 10/1995 | Kojima et al. | ..................... | 95/11 |
| 5,628,928 A * | 5/1997 | Rolf | .............................. | 219/488 |
| 5,656,048 A * | 8/1997 | Smith et al. | ...................... | 55/282 |
| 7,303,603 B2 * | 12/2007 | Gregoire et al. | ............. | 55/282.3 |
| 7,469,532 B2 * | 12/2008 | Williamson et al. | ............ | 60/295 |
| 7,572,416 B2 * | 8/2009 | Alward et al. | ................ | 422/180 |

* cited by examiner

*Primary Examiner* — Nina Bhat
(74) *Attorney, Agent, or Firm* — Christie, Parker, Hale

(57) ABSTRACT

A resistively heated diesel particulate filter (DPF). The resistively heated DPF includes a DPF having an inlet surface and at least one resistive coating on the inlet surface. The at least one resistive coating is configured to substantially maintain its resistance in an operating range of the DPF. The at least one resistive coating has a first terminal and a second terminal for applying electrical power to resistively heat up the at least one resistive coating in order to increase the temperature of the DPF to a regeneration temperature. The at least one resistive coating includes metal and semiconductor constituents.

21 Claims, 4 Drawing Sheets

Chart A  Chart B

ELECTRICALLY RESISTIVE COATING FOR REMEDIATION (REGENERATION) OF A DIESEL PARTICULATE FILTER AND METHOD

STATEMENT REGARDING FEDERALLY SPONSORED RESEARCH OR DEVELOPMENT

This invention was made with U.S. Government support under Contract No. DE-FC-04-03AL67635 awarded by the Department of Energy. The U.S. Government has certain rights to this invention.

BACKGROUND

A diesel particulate filter (DPF) is a device designed to remove diesel particulate matter or soot from the exhaust gas of a diesel engine. A well known DPF type is a wall-flow type filter made of cordierite (a ceramic material). The DPF is designed to force the exhaust gas from a diesel engine to flow through the wall of the filter while the particulates collect on the filter wall. Wall-flow DPF usually remove 85% or more of the soot, and can at times achieve efficiencies of close to 100%. A diesel engine equipped with functioning DPF emits no visible smoke from its exhaust pipe.

However, after a period of operation, the DPF must be regenerated (i.e., removal of collected particulates or soot from the wall of the filter). Regeneration of the DPF can be achieved by burning off the accumulated particulates, either through the use of a catalyst (i.e., passive) or through an active method such as engine management to heat the DPF to particulate/soot combustion temperature. Since the exhaust temperature of a diesel engine during normal operation is around 150-250° C., considerably lower than what is required for thermally regenerating a DPF, there is a need to increase the temperature of the DPF to around 550-850° C. to initiate a self-propagating particulate/soot combustion event. Some examples of regeneration methods include: microwave energy, resistive heating coils, fuel burning/engine management, and catalytic oxidizers. These methods generally cycle through relatively long soot/particulate accumulation times alternating with short and high temperature regeneration periods. Two of the methods rely on increasing the engine exhaust gas temperature to the point where soot/particulate combustion occurs. These methods require the use of either an electric heater or a fuel burner to directly heat the exhaust gas that in turn indirectly raises the temperature of the DPF. The downside of either approach is that not all the heat transferred to the exhaust gas is transferred to the DPF. Much of the exhaust passes through the DPF with incomplete heat transfer, creating a large inefficiency. The problem is worse for the case of the fuel burner. Here the inefficiency is compounded by the creation of additional particulates and hydrocarbon emissions, a lower exhaust oxygen concentration, and shorter lifetimes for the DPF due to cracking from thermal gradients.

Microwave heating has also been explored as a method to efficiently raise the temperature of the DPF to the soot/particulate combustion temperature. To achieve this, either the entire DPF or at least selected regions of the DPF is made of a material that is able to absorb microwave energy at the frequency of operation. This has led to strategies where the entire DPF is made from an expensive microwave absorbing ceramic material such as silicon carbide (SiC), or where a standard cordierite DPF is selectively coated with an absorbing material. In both cases, parasitic absorption of microwave energy by the soot/particulate effectively reduces the regeneration efficiency to a undesirable level.

Generally, a filter system can employ one of two different types of resistive heating methods. As to a first type, the heating element is integrated into the filter itself consisting a single or mixed element coating that is heated to regeneration temperatures. As to a second type, the filter system contains a separate heating element that is heated separately to transfer heat to the filter system to obtain the desired regeneration temperatures. However, the heating element of the filter system may suffer from changing resistivity due to changing temperature throughout a regeneration cycle.

A conventional wall-flow type DPF made from the mineral cordierite is effective in trapping diesel particulates/soot, but once the DPF is saturated, it must be regenerated to remove the trapped particulates. One method for regeneration of a DPF is by controlled combustion of the particulates initiated from an exothermic event at the front face of the DPF. FIG. 1 illustrates a resistively heated metal coil 10 in a spiral shape installed on the front face 20 of a DPF 30 which is loaded with particulates/soot. By applying an electrical power across the two terminals 35 of the metal coil 10, the metal coil 10 is heated up.

FIG. 2 illustrates how the resistively heated metal coil 10 in contact with the front face 20 of the DPF 30 can initiate the regenerative combustion process. That is, resistive heat generated from the resistively heated metal coil 10 ignites particulates/soot 40 trapped in the front section of the DPF 30. As the particulates/soot combust locally, the heat generated by the exothermic reaction ignites particulates/soot in the neighboring section of the channel within the DPF 30. The process is repeated as the particulates/soot combustion exotherm propagates along the entire length of the DPF 30. Alternative, the resistively heated metal coil 10 can be replaced with a metallic thick film coating with the same pattern on the front face 20 of the DPF. Methods of depositing a metallic coating includes, for example, chemical vapor deposition, spray coating, dip coating, and screen printing.

SUMMARY OF THE INVENTION

Embodiments of the present invention provide a resistively heated diesel particulate filter that can substantially maintain its resistance during an operating range of a diesel particulate filter. Embodiments of the present invention also provide a method of resistively heating a diesel particulate filter.

In one embodiment according to the present invention, a resistively heated diesel particulate filter is provided. The resistively heated diesel particulate filter includes a diesel particulate filter having an inlet surface and at least one resistive coating on the inlet surface. The at least one resistive coating includes a first terminal and a second terminal for applying electrical power to resistively heat the at least one resistive coating to increase the temperature of the diesel particulate filter to a regeneration temperature. The at least one resistive coating is configured to substantially maintain its resistance in an operating temperature range of the diesel particulate filter.

The at least one resistive coating may include a metal constituent and a semiconductor constituent. The metal constituent comprises one of noble metal or semi-noble metal. The metal constituent may include one of silver, platinum, rhodium, iridium, palladium, osmium, or gold. The semiconductor constituent may include one of ceramic oxides, carbides, phosphides, halides, sulfides, selenides, silicides, or nitrides. The semiconductor constituent may include an oxidation resistant material selected from one of silicon carbide, indium tin oxide, ruthenium oxide, rhenium oxide, titanium monoxide, or tin oxide. The at least one resistive coating may be configured to substantially maintain its resistance in the range of minus 50% and plus 25% in the operating temperature range of the diesel particulate filter. The at least one resistive coating may cover only a portion of the inlet surface. The at least one resistive coating may have a spiral pattern.

According to another embodiment of the present invention, a resistively heated diesel particulate filter is provided. The resistively heated diesel particulate filter includes a diesel particulate filter having an inlet surface; and at least one resistive coating on the inlet surface. The at least one resistive coating has a first terminal and a second terminal for applying electrical power to resistively heat the at least one resistive coating to increase the temperature of the diesel particulate filter to a regeneration temperature. The at least one resistive coating includes a metal constituent and a semiconductor constituent. The metal constituent and the semiconductor constituent are selected to substantially maintain a resistance of the at least one resistive coating in the range of minus 50% to plus 25% in the operating temperature range of the diesel particulate filter.

The metal constituent may include one of noble metal or semi-noble metal. The metal constituent may be selected from one of silver, platinum, rhodium, iridium, palladium, osmium, or gold. The semiconductor constituent may be selected from one of ceramic oxides, carbides, phosphides, halides, sulfides, selenides, silicides, or nitrides. The semiconductor constituent may include an oxidation resistant material selected from one of silicon carbide, indium tin oxide, ruthenium oxide, rhenium oxide, titanium monoxide, and tin oxide.

According to still another embodiment of the present invention, a method of heating a diesel particular filter is provided. At least one resistive coating is applied on an inlet surface of the diesel particular filter. The at least one resistive coating has a first terminal and a second terminal. Electrical power is applied across the first terminal and the second terminal to increase the temperature of the at least one resistive coating to increase the temperature of the diesel particulate filter to a regeneration temperature. The at least one resistive coating includes a metal constituent and a semiconductor constituent, and the metal constituent and the semiconductor constituent are selected to maintain a resistance of the at least one resistive coating in the range of minus 50% to plus 25% in the operating temperature range of the diesel particulate filter. The metal constituent may include one of noble metal or semi-noble metal. The metal constituent may include one or more of silver, platinum, rhodium, iridium, palladium, osmium, or gold. The semiconductor constituent may include one or more of ceramic oxides, carbides, phosphides, halides, sulfides, selenides, silicides, or nitrides. The semiconductor constituent may include an oxidation resistant material selected from one or more of silicon carbide, indium tin oxide, ruthenium oxide, rhenium oxide, titanium monoxide, or tin oxide. The at least one resistive coating may cover only a portion of the inlet surface. The at least one resistive coating may have a spiral pattern.

DETAILED DESCRIPTION OF EXEMPLARY EMBODIMENTS

Embodiments of the present invention provide a DPF that includes one or more adaptive resistive coatings as an integrated heating element to increase the temperature of the DPF to initiate filter regeneration (a.k.a. remediation). The adaptive resistive coatings are designed to have a relatively small resistance variation throughout the regeneration cycle. Embodiments of the present invention also provide a method of regenerating a DPF by using an integrated adaptive resistive coating as a heating element.

Initial results of using a purely metallic thick film coating as a resistive heater illustrate some fundamental problems including robustness, thermal runaway when the resistance is too low, and insufficient power when the resistance is too high. Embodiments of the present invention provide a thick film coating material where its resistance adapts as the temperature changes. An exemplary resistive coating with such property may be created by using a combination of materials where the overall change of resistivity is near zero with temperature. In one embodiment, the resistive coating is made from a material including a combination of metal and ceramic, such as cermet. The metal and ceramic constituents in an exemplary resistive coating are combined to have the desired resistance properties. Equations (1) and (2) set forth below demonstrate the change of resistivity of metal and ceramic constituents, respectively. Equation (1) illustrates change in resistivity of an exemplary metal with temperature.

$$\rho_t = \rho_0(1+\alpha T) \quad (1)$$

where $\rho_t$ is the resistivity at temperature T, $\rho_o$ is the resistivity at room temperature and $\alpha$ is the temperature coefficient of resistance of the exemplary metal.

Equation (2) illustrates the resistivity of an exemplary semiconductor material (e.g., silicon carbide and certain ceramic oxides,) decreases with temperature.

$$\rho_t = \rho_0 e^{(E_g/2kT)} \quad (2)$$

where $\rho_t$ is the resistivity at temperature T, $\rho_o$ is the resistivity at room temperature and $E_g$ is the band gap of the semiconductor and k is Boltzmann's constant.

Figure 1:
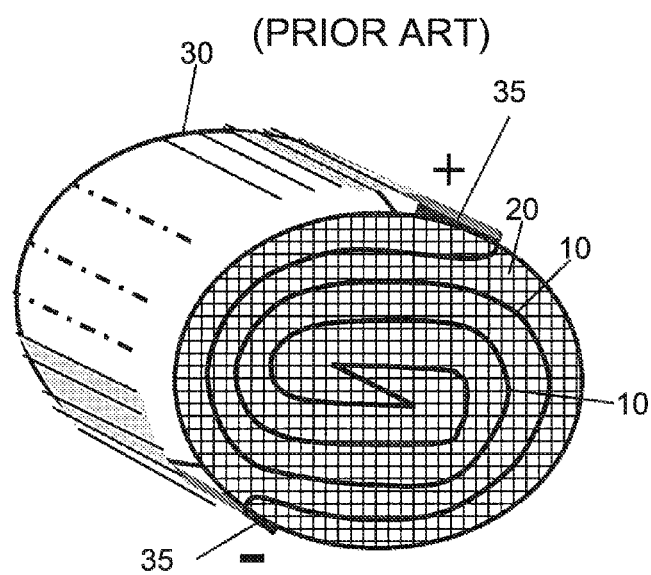
FIG. 1 is a perspective view of a conventional DPF with a heating element.
Figure 2:
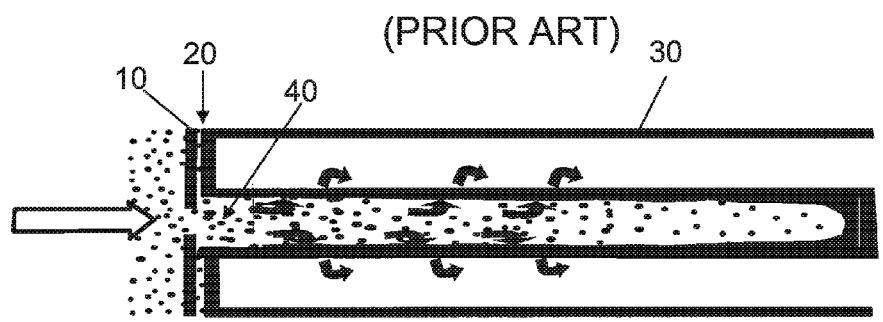
FIG. 2 is a side sectional view of the DPF of FIG. 1.
Figure 3:
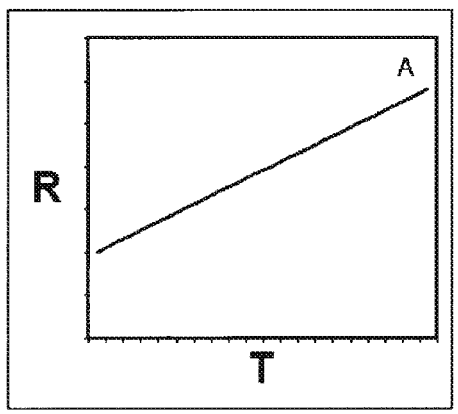
FIG. 3 shows resistivity charts of exemplary metal and semiconductor materials.
Figure 3:
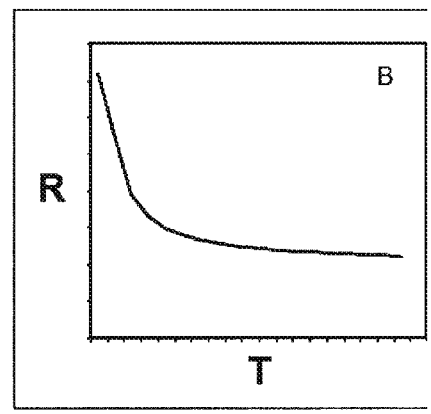

FIG. 3 graphically illustrates equations (1) and (2). Chart A represents the change of resistivity of an exemplary metal with temperature, and chart B represents the change of resistivity of an exemplary semiconductor material (e.g., ceramic) with temperature.

Taking into consideration the properties of the metal and semiconductor constituents of the resistive coating, a minimum amount of metal would be required for appreciable electrical conduction at room temperature (e.g., 25° C.). According to percolation theory, the lower limit or critical threshold to observe the property of a single component in a mixture is approximately around 15% by volume. (See, H. Scher and R. Zallen, J. Chem. Phys, 53[1970], 3759). Based on the temperature required for regeneration (e.g., 700-900° C.), a tailored composition of a cermet material with a near zero resistance change in this temperature range is within the percolation limit.

Figure 4:
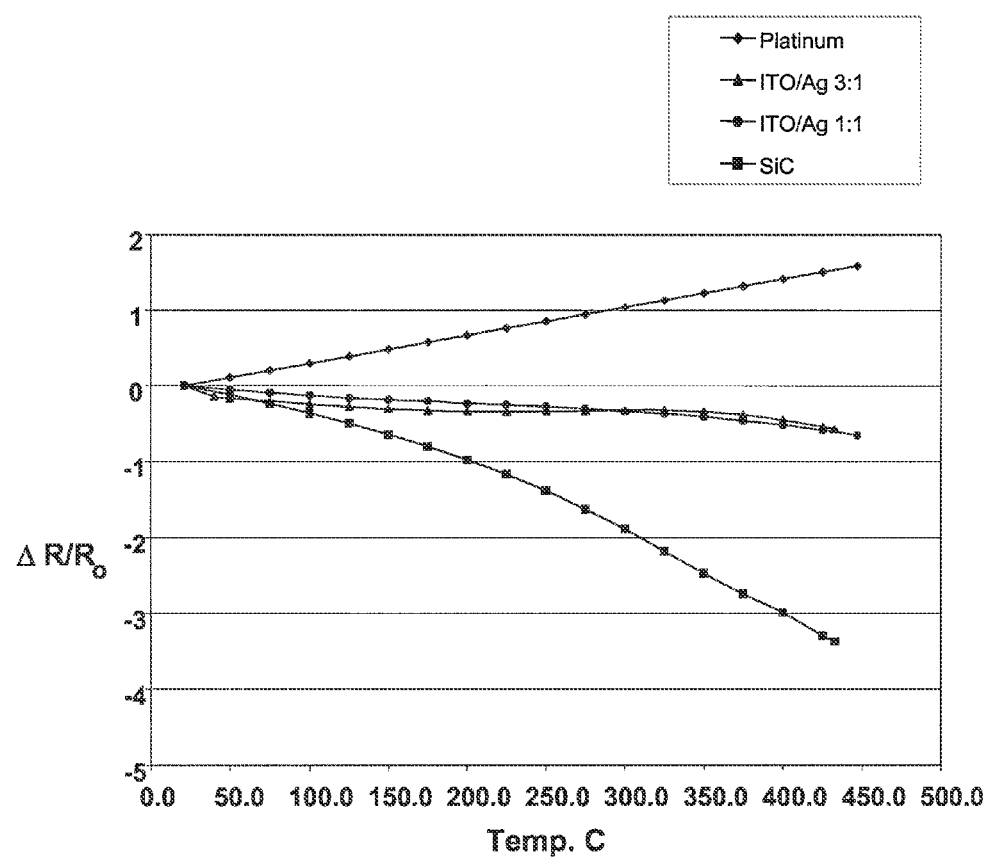
FIG. 4 is a chart illustrating relative resistance change of different coating materials with temperature.

FIG. 4 illustrates the relative resistance change of three candidate coatings with temperature. For the case of platinum metal, the resistance change was calculated using well established values in the literature and the relationship presented in Equation (1). All other data are obtained from thin film coating samples. As can be seen in the FIG. 4, the relative change in resistance of platinum when heating from room temperature to 450° C. is about 150%. Although not shown in FIG. 4, the resistance change of platinum when heating to the target regeneration temperature of around 825° C. is about 300%. Therefore, to maintain a fixed power output (i.e., power dissipation) from a platinum resistive heater as it rises to the final temperature, a 300% increase in the operating voltage supplied to the platinum resistive heater is expected. Assuming an upper limit on the operating voltage is 12V, the platinum resistive heater should be designed to initially heat from room temperature (e.g., 25° C.) using only 3V to anticipate the increase of resistance as temperature rises. Therefore, a platinum resistive heater should have an extremely low initial resistance (e.g., <0.10Ω for 1500 W), equating to a very thick film of platinum. Conversely, if a semiconductor material type (e.g., silicon carbide) resistive coating is considered, the relative change in resistance with increasing temperature is negative. During heating, a resistive heater with semiconductor type material has the desirable property of requiring less voltage to maintain the same power output. However, because of the very large negative change in resistance (e.g., >500% for silicon carbide) while heating to the target temperature, the initial resistance of a semiconductor material type resistive coating must be made very high. Assuming an operating voltage has a limit of 12 V, the initial resistance of the coating therefore becomes too high and does not allow significant current to flow through the resistive coating for initial heating.

Embodiments of the present invention provide a cermet material formulated with desired electrical properties that is applied on a front face surface of a DPF as a resistive coating for heating the DPF to a regeneration temperature. The cermet material may be made using conventional powder metallurgy techniques which is known in the art. For example, the cermet material can be made simply by combining the desired amount of metal powder with semiconductor powder in a liquid binder (e.g., an alumina-based aqueous binder). In some embodiments of the present invention, the particle size of the metal and semiconductor are matched such that one does not settle out of solution. Furthermore, ball milling these components for an extended amount of time ensures complete mixing of the metal powder and the semiconductor power.

Figure 5:
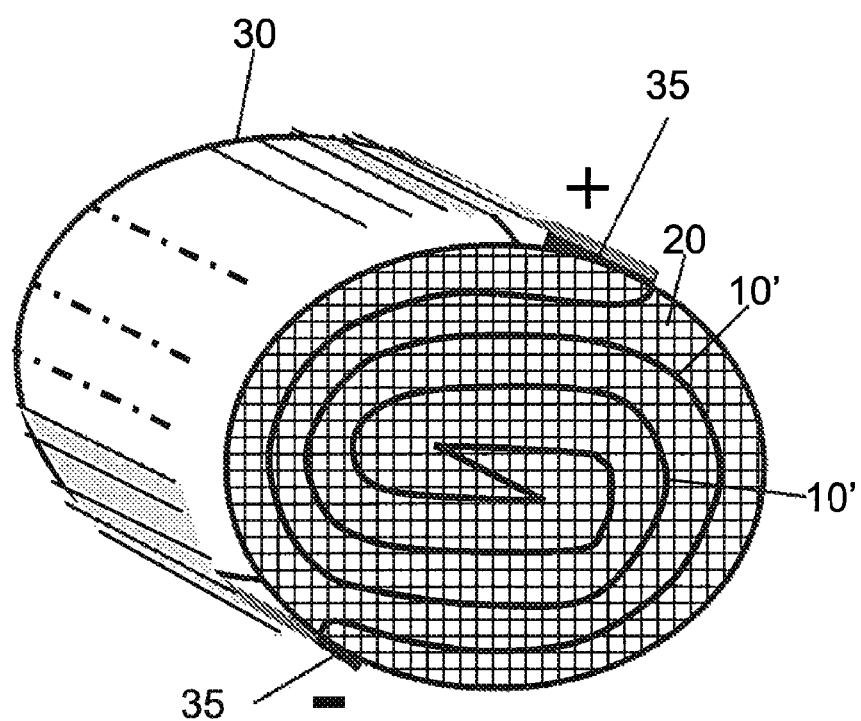
FIG. 5 is a DPF with a resistive coating according to an exemplary embodiment of the present invention.

FIG. 5 illustrates a DPF according to embodiments of the present invention. A resistive coating 10' covers a portion of the front face surface 20 of the DPF 30 without significantly affecting airflow into the DPF 30. The resistive coating 10' can be applied using common coating methods known by those skilled in the art. By way of example, a mask can be employed to ensure that the specific resistive coating design (e.g., a spiral pattern) is preserved. The resistive coating 10' can be directly applied to the DPF as is, or the DPF can be pre-hydrated to control the liquid absorption of the resistive coating 10' into the DPF. The DPF can be hydrated to a specific level prior to applying the resistive coating 10' (e.g., a cermet coating). Some known methods of coating applicable to the present invention are physical vapor deposition, spray coating, dip coating, and painting, the present invention is not limited thereto. Once the resistive coating 10' is applied, the DPF can be air dried followed by curing in a furnace for about an hour. The curing temperature will typically be below the oxidation temperature of the metal employed in the resistive coating 10' (e.g., a cermet coating).

The resistive coating 10' may have various patterns, for example, the resistive coating 10' has a spiral pattern, but the present invention is not limited thereto. Also multiple resistive coatings 10' can be applied to the front face surface 20 where each of the resistive coatings 10' covers a different area on the surface. The resistive coating (e.g., cermet mixture) includes metal and semiconductor constituents. The metal constituent can include, but not limited to, noble and non-noble metals such as silver (Ag), platinum (Pt), rhodium (Rh), iridium (Ir), palladium (Pd), osmium (Os), and/or gold (Au). The semiconductor constituent can include, but not limited to, ceramic oxides, carbides, phosphides, halides, sulfides, selenides, silicides, and/or nitrides. The semiconductor constituent can also include an oxidation resistant material such as silicon carbide, indium tin oxide, ruthenium oxide, rhenium oxide, titanium monoxide, and tin oxide. The resistive coating 10' is designed to have a small resistance variation in a temperature range in which the DPF is operated. According to one embodiment, the resistive coating 10' may have a change in resistance from minus 50% to plus 25% between the temperature range of 0° C. and 1100° C. However, the present invention is not limited thereto.

By way of example, thin film samples of a semiconductor material (e.g., silicon carbide or indium tin oxide) is mixed with silver to form a material suitable as a resistive heater material. FIG. 4 shows the relative resistance change with temperature up to 450° C. for two thin film samples consisting of indium tin oxide mixed with silver having respective 3:1 and 1:1 ratios by weight. As can be seen in FIG. 4, their relative resistance change is much less than for either the pure metal material or the pure semiconductor material. In addition, the 65-70% change is negative, allowing the voltage requirement to decrease proportionately as the resistive coating heats up. By adjusting the amount of metal in the cermet mixture, the initial resistance of the thin film resistive coating may be tailored to allow initial heating within 12 V which is a typical voltage limit in vehicle application.

Although certain exemplary embodiments of the present invention have been disclosed for illustrative purposes, those skilled in the art will appreciate that various modifications, additions and substitutions are possible, without departing from the scope and spirit of the present invention as disclosed in the accompanying claims and their equivalents.

What is claimed is:

1. A resistively heated diesel particulate filter comprising:
   a diesel particulate filter having an inlet surface; and
   at least one resistive coating on the inlet surface, the at least one resistive coating having a first terminal and a second terminal for applying electrical power to resistively heat the at least one resistive coating to increase the temperature of the diesel particulate filter to a regeneration temperature,
   wherein the at least one resistive coating is configured to substantially maintain its resistance in an operating temperature range of the diesel particulate filter.

2. The resistively heated diesel particulate filter of claim 1, wherein the at least one resistive coating comprises a metal constituent and a semiconductor constituent.

3. The resistively heated diesel particulate filter of claim 2, wherein the metal constituent comprises one of noble metal or semi-noble metal.

4. The resistively heated diesel particulate filter of claim 3, wherein the metal constituent is selected from a group consisting of silver, platinum, rhodium, iridium, palladium, osmium, and gold.

5. The resistively heated diesel particulate filter of claim 2, wherein the semiconductor constituent is selected from a group consisting of ceramic oxides, carbides, phosphides, halides, sulfides, selenides, silicides, and nitrides.

6. The resistively heated diesel particulate filter of claim 2, wherein the semiconductor constituent comprises an oxidation resistant material selected from a group consisting of silicon carbide, indium tin oxide, ruthenium oxide, rhenium oxide, titanium monoxide, and tin oxide.

7. The resistively heated diesel particulate filter of claim 1, wherein the at least one resistive coating is configured to substantially maintain its resistance in the range of minus 50% to plus 25% in the operating temperature range of the diesel particulate filter.

8. The resistively heated diesel particulate filter of claim 1, wherein the at least one resistive coating covers only a portion of the inlet surface.

9. The resistively heated diesel particulate filter of claim 1, wherein the at least one resistive coating has a spiral pattern.

10. A resistively heated diesel particulate filter comprising:
   a diesel particulate filter having an inlet surface; and
   at least one resistive coating on the inlet surface, the at least one resistive coating having a first terminal and a second terminal for applying electrical power to resistively heat the at least one resistive coating to increase the temperature of the diesel particulate filter to a regeneration temperature,
   wherein the at least one resistive coating comprises a metal constituent and a semiconductor constituent, and
   wherein the metal constituent and the semiconductor constituent are selected to substantially maintain a resistance of the at least one resistive coating in the range of minus 50% to plus 25% in the operating temperature range of the diesel particulate filter.

11. The resistively heated diesel particulate filter of claim 10, wherein the metal constituent comprises one of noble metal or semi-noble metal.

12. The resistively heated diesel particulate filter of claim 11, wherein the metal constituent is selected from a group consisting of silver, platinum, rhodium, iridium, palladium, osmium, and gold.

13. The resistively heated diesel particulate filter of claim 10, wherein the semiconductor constituent is selected from a group consisting of ceramic oxides, carbides, phosphides, halides, sulfides, selenides, silicides, and nitrides.

14. The resistively heated diesel particulate filter of claim 10, wherein the semiconductor constituent comprises an oxidation resistant material selected from a group consisting of silicon carbide, indium tin oxide, ruthenium oxide, rhenium oxide, titanium monoxide, and tin oxide.

15. A method of heating a diesel particular filter, the method comprising:
   applying at least one resistive coating on an inlet surface of a diesel particular filter, the at least one resistive coating having a first terminal and a second terminal; and
   applying electrical power across the first terminal and the second terminal to increase the temperature of the at least one resistive coating to increase the temperature of the diesel particulate filter to a regeneration temperature,
   wherein the at least one resistive coating comprises a metal constituent and a semiconductor constituent, and
   wherein the metal constituent and the semiconductor constituent are selected to maintain a resistance of the at least one resistive coating in the range of minus 50% to plus 25% in the operating temperature range of the diesel particulate filter.

16. The method of claim 15, wherein the metal constituent comprises one of noble metal or semi-noble metal.

17. The method of claim 16, wherein the metal constituent is selected from a group consisting of silver, platinum, rhodium, iridium, palladium, osmium, and gold.

18. The method of claim 15, wherein the semiconductor constituent is selected from a group consisting of ceramic oxides, carbides, phosphides, halides, sulfides, selenides, silicides, and nitrides.

19. The method of claim 15, wherein the semiconductor constituent comprises an oxidation resistant material selected from a group consisting of silicon carbide, indium tin oxide, ruthenium oxide, rhenium oxide, titanium monoxide, and tin oxide.

20. The method of claim 15, wherein the at least one resistive coating covers only a portion of the inlet surface.

21. The method of claim 15, wherein the at least one resistive coating has a spiral pattern.

\* \* \* \* \*